(12) United States Patent
Gordon

(10) Patent No.: US 11,747,783 B2
(45) Date of Patent: Sep. 5, 2023

(54) REMOTE-CONTROLLED TRASH AND RECYCLING RECEPTACLES

(71) Applicant: Ryan Gordon, San Diego, CA (US)

(72) Inventor: Ryan Gordon, San Diego, CA (US)

( * ) Notice: Subject to any disclaimer, the term of this patent is extended or adjusted under 35 U.S.C. 154(b) by 155 days.

(21) Appl. No.: 17/341,199

(22) Filed: Jun. 7, 2021

(65) Prior Publication Data

US 2022/0390916 A1 Dec. 8, 2022

(51) Int. Cl.
*G05B 19/042* (2006.01)
*G06Q 10/30* (2023.01)

(52) U.S. Cl.
CPC ............ *G05B 19/0426* (2013.01); *G05B 2219/33155* (2013.01); *G06Q 10/30* (2013.01)

(58) Field of Classification Search
CPC ...... G05B 19/0426; G05B 2219/33155; G06Q 10/30; G05D 1/0246; G05D 1/0278
See application file for complete search history.

(56) References Cited

U.S. PATENT DOCUMENTS

| | | | | |
|---|---|---|---|---|
| 5,065,921 | A | * | 11/1991 | Mobley ............ B60R 9/10 224/493 |
| 10,138,100 | B2 | * | 11/2018 | Thompson ............ G06Q 50/28 |
| 2007/0209846 | A1 | | 9/2007 | Wilson |
| 2008/0038102 | A1 | | 2/2008 | Murphy et al. |
| 2008/0140253 | A1 | * | 6/2008 | Brown ............ B65F 1/1638 701/23 |
| 2019/0106144 | A1 | * | 4/2019 | McCall ............ B62D 1/283 |
| 2019/0112127 | A1 | | 4/2019 | Soucy |
| 2021/0114806 | A1 | * | 4/2021 | Murray ............ B65F 1/1468 |

* cited by examiner

*Primary Examiner* — Thomas C Lee
*Assistant Examiner* — Tyler Dean Hedrick
(74) *Attorney, Agent, or Firm* — Klarquist Sparkman, LLP

(57) ABSTRACT

A remotely-controllable transporter for waste receptacles is disclosed herein in several examples. As one example, the remotely-controllable transporter may include an axle for replacing a native waste receptacle axle and be configured to removably attach thereto. In another example, the remotely-controllable transporter may include side brackets to removably attach to a variety of waste receptacles. In yet another example, the remotely-controllable transporter may be part of an integrally-formed waste receptacle assembly. Also disclosed herein are methods for use of the disclosed remotely-controllable transporters and waste receptacle assemblies.

19 Claims, 8 Drawing Sheets

REMOTE-CONTROLLED TRASH AND RECYCLING RECEPTACLES

FIELD

The present disclosure relates generally to remotely-controllable waste and recycling receptacles, and more particularly to remotely-controllable transport devices for use with waste and recycling receptacles, as well as methods for using the same.

BACKGROUND

Management of a residential waste stream involves periodic collection of residential wastes for transport to a central processing location, such as a landfill. Waste receptacles have long been a conventional way to put residential and commercial waste out for collection by a waste collection service provider and allow for waste materials to be sorted according to the correct disposal streams (e.g. glass, plastic, paper recyclables, and landfill waste). Traditional waste receptacles must be moved manually from the location at which waste materials are disposed, such as a residential and commercial properties, to a point at which they are collected. Full waste receptacles, however, can be heavy and inconvenient or even hazardous to move. Accordingly, there is a need for remotely-controllable devices to move waste receptacles to and from designated collection points.

SUMMARY

Disclosed herein are waste receptacle remote transport devices and waste receptacle assemblies having waste receptacle remote transport devices. The waste receptacle remote transport devices can be used by a remote human user to remotely deliver a waste receptacle to a designated waste collection point without the need for any manual repositioning of the waste receptacle, or physical presence of the remote human user near the waste collection point. In some examples, the waste receptacle remote transport devices can replace an existing axle and wheels of a waste receptacle. In other examples, the waste receptacle remote transport devices can comprise one or more brackets or braces to restrain a waste receptacle. Also disclosed herein are methods of waste disposal using the waste receptacle remote transporters disclosed herein.

Certain examples of the disclosure concern a waste receptacle remote transport device having a first axle assembly and a waste receptacle attachment feature. The first axle assembly includes a first axle, one or more wheels configured to move and steer the waste receptacle remote transport device, and one or more motor components configured to rotate the one or more wheels. The waste receptacle attachment is configured to removably attach the waste receptacle remote transport device to a waste receptacle. The waste receptacle remote transport device further includes a power source configured to supply power to the one or more motor components and an electronics module. The electronics module includes one or more microprocessors configured to control the one or more motor components and a two-way communication device configured to receive input commands from a human user through a computerized device, to relay the input commands to the one or more microprocessors, to receive data from the microprocessor, and to transmit data from the microprocessor to the human user through the computerized device.

Certain examples of the disclosure concern a remotely positionable waste receptacle assembly having a waste receptacle and a waste receptacle remote transport device. The waste receptacle remote transport device can include a first axle assembly. The first axle assembly is integrally attached to the waste receptacle and has a first axle, one or more wheels configured to move and steer the waste receptacle remote transport device, and one or more motor components configured to rotate the one or more wheels. The waste receptacle remote transport device also includes a power source configured to supply power to the one or more motor components and an electronics module that has one or more microprocessors configured to control the one or more motor components and a two-way communication device configured to receive input commands from a human user through a computerized device, to relay the input commands to the one or more microprocessors, to receive data from the microprocessor, and to transmit data from the microprocessor to the human user through the computerized device.

Certain examples of the disclosure concern a method for remote waste disposal including disposing of one or more waste materials in one or more waste receptacle assemblies each having a waste receptacle remote transporter while the one or more waste receptacle assemblies are in a one or more waste disposal locations; The method also includes transmitting one or more remote positioning commands from a remote human user to one or more waste receptacle remote transporters via one or more computerized devices, transmitting sensor data from the one or more waste receptacle remote transporters to a remote human user via one or more computerized devices, adjusting the one or more remote positioning commands from the remote human user based on the sensor data received from the one or more waste receptacle remote transporters. The method further includes driving the one or more waste receptacle assemblies from the one or more waste disposal locations to one or more waste collection locations based on the one or more remote positioning commands from the remote human user, collecting the waste materials from the one or more waste receptacle assemblies at the one or more waste collection locations, returning the one or more waste receptacle assemblies having a waste receptacle remote transporter to the one or more waste disposal locations.

The foregoing and other objects, features, and advantages of the invention will become more apparent from the following detailed description, which proceeds with reference to the accompanying figures.

BRIEF DESCRIPTION OF THE DRAWINGS

A full and enabling disclosure of the preferred embodiments directed to one of ordinary skill in the art, is set forth in the specification, which makes reference to the appended figures, in which.

DETAILED DESCRIPTION

General Considerations

Figure 1:
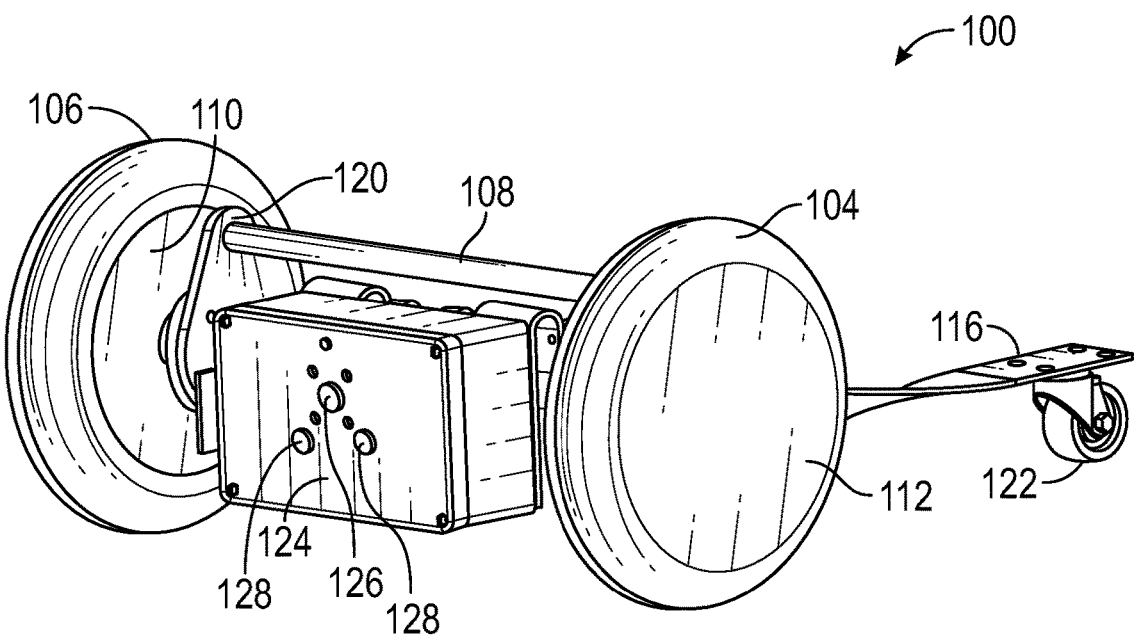
FIG. 1 illustrates a front perspective view of a waste receptacle remote transporter according to one disclosed embodiment.

For purposes of this description, certain aspects, advantages, and novel features of the examples of this disclosure are described herein. The disclosed methods, apparatus, and systems should not be construed as being limiting in any way. Instead, the present disclosure is directed toward all novel and nonobvious features and aspects of the various disclosed examples, alone and in various combinations and sub-combinations with one another. The methods, apparatus, and systems are not limited to any specific aspect or feature or combination thereof, nor do the disclosed examples require that any one or more specific advantages be present, or problems be solved. The technologies from any example can be combined with the technologies described in any one or more of the other examples.

Although the operations of some of the disclosed examples are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used herein, the terms "integrally formed" and "unitary construction" refer to a construction that does not include any welds, fasteners, or other means for securing separately formed pieces of material to each other.

As used herein, operations that occur "simultaneously" or "concurrently" occur generally at the same time as one another, although delays in the occurrence of operation relative to the other due to, for example, spacing between components, are expressly within the scope of the above terms, absent specific contrary language.

As used in this application and in the claims, the singular forms "a," "an," and "the" include the plural forms unless the context clearly dictates otherwise. Additionally, the term "includes" means "comprises." Further, the term "coupled" generally means physically, mechanically, chemically, magnetically, and/or electrically coupled or linked and does not exclude the presence of intermediate elements between the coupled or associated items absent specific contrary language. As used herein, "and/or" means "and" or "or," as well as "and" and or.

Directions and other relative references may be used to facilitate discussion of the drawings and principles herein, but are not intended to be limiting. For example, certain terms may be used such as "inner," "outer," "upper," "lower," "inside," "outside,", "top," "bottom," "interior," "exterior," "left," "right," and the like. Such terms are used, where applicable, to provide some clarity of description when dealing with relative relationships, particularly with respect to the illustrated examples. Such terms are not, however, intended to imply absolute relationships, positions, and/or orientations. For example, with respect to an object, an "upper" part can become a "lower" part simply by turning the object over. Nevertheless, it is still the same part and the object remains the same.

Introduction

In recent years, management of a residential or commercial waste stream has seen a growth in the complexity of the demands on both the customer and the collection service. Residential or commercial waste collection customers must often sort waste into landfill garbage, yard clippings, organic and food waste, and recyclables such as glass, plastic, and paper, each of which may require a separate receptacle. Each receptacle may require collection on multiple days a week, and in some cases each receptacle may be collected on a different day of the week.

Additionally, the weight capacity of waste receptacles has increased along with the increasing capabilities of collection vehicles such as garbage trucks. Some receptacles may weigh as much as 350 pounds when fully-loaded. Bringing the receptacles to the curb, especially in periods of inclement weather, may pose hazardous to some residents or workers at a commercial facility, especially those not in optimal health.

Furthermore, local residential organizations such as homeowner's associations may impose additional rules and further challenges to the residential waste stream management problem. For example, a homeowner's association may limit the time for which a waste receptacle may be positioned at the curb or may restrict how far in advance or on which days a resident may position a waste receptacle at the curb for collection.

Additionally, the delivery of waste receptacles to a collection point such as the curb or roadside may be interrupted when the waste collection customer is not present, particularly in the case of residential customers. In particular, if a customer needs to travel, they will not be present to move the waste receptacle to the collection point, and the waste may not be collected unless the customer moves the receptacle in advance of any travel.

There exists, therefore, a need for a remotely-positionable waste receptacle for delivering waste materials from a residential or commercial location to a designated collection point.

Overview

Disclosed herein are waste receptacle remote transporters configured for use with domestic and commercial waste receptacles, and waste receptacles having remote transporters. Waste receptacle remote transporters generally comprise a drive control module, a motor configured to drive at least one axle, and one or more steering mechanisms. The drive control module can control the motor, the steering mechanism, or both. The axle can have one or more wheels configured to provide forward or backward motion. The orientation of the one or more wheels may be controlled by the steering mechanism to allow for steering of the waste receptacle transporter. In particular embodiments, the waste receptacle remote transporter can further comprise signal receiver and a signal transmitter. The signal receiver can receive user input and communicate that input to the drive control module. The signal transmitter can transmit feedback data to the user or to a user input module.

Waste receptacle remote transporters such as those disclosed herein may be configured to work with various existing waste receptacle designs. For waste receptacles, such as dumpsters or wheeled garbage cans, already having an axle and one or more wheels, the waste receptacle remote transporter can be configured to replace or attach to the existing axle. For waste receptacles, such as recycling crates or garbage cans without wheels, the waste receptacle remote transporters disclosed herein may further comprise an attachment structure configured to attach the waste receptacle remote transporter to a wide range of waste receptacle designs.

The various waste receptacle remote transporters disclosed herein are configured to either be removably attached to or integrally formed a waste receptacle and to transport the waste receptacle to a designated collection location without the need for any local human interaction with the waste receptacle.

Also disclosed herein are exemplary methods of use for the various waste receptacles having remote transporters disclosed herein. In a general embodiment, waste may be disposed of in a first location, and the waste receptacle having a remote transporter may, under the direction of a remote user, be driven to a second location at which the waste materials may be collected. The remote user may further employ feedback from the waste receptacle remote transporter to revise and adjust the directions given to the waste receptacle remote transporter. After wastes have been collected, the waste receptacle may be returned to the first location for continued convenient waste disposal.

Specific Embodiments

Figure 2:
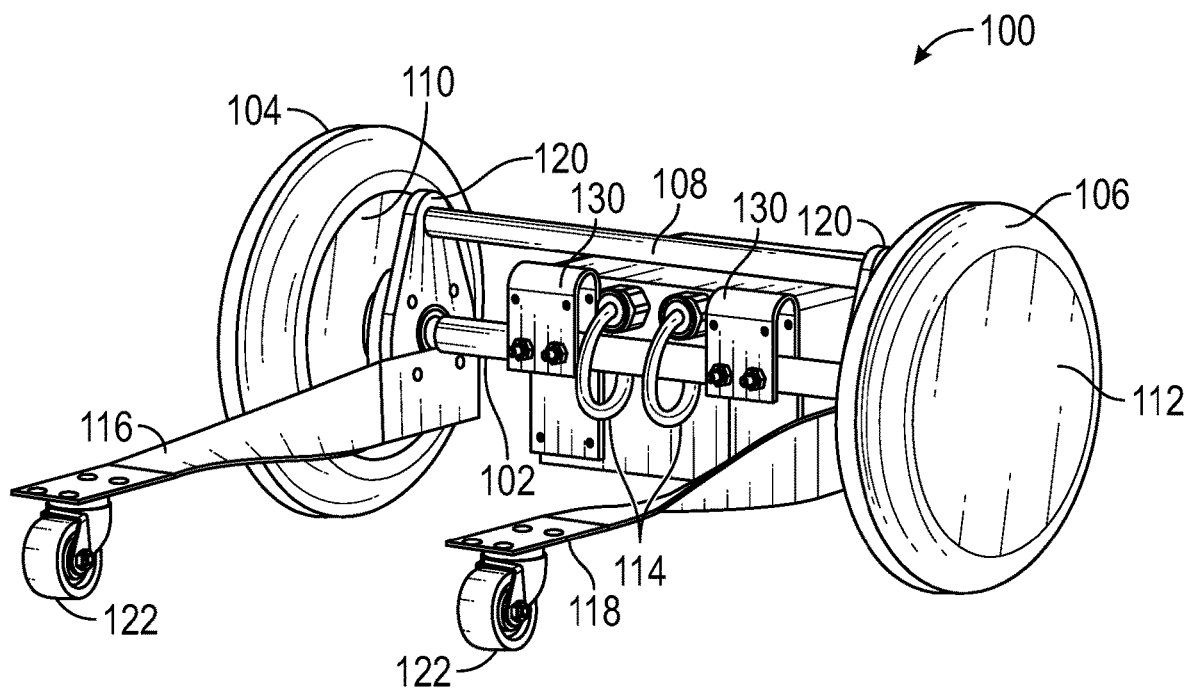
FIG. 2 illustrates a rear perspective view of the waste receptacle remote transporter of FIG. 1.

FIGS. 1-2 show one embodiment of a waste receptacle remote transporter according to the present disclosure. As best shown in FIG. 2 the waste receptacle remote transporter 100 comprises a primary axle 102 a first motor wheel 104, a second motor wheel 106 and a power source. In certain embodiments, waste receptacle remote transporter 100 may be attached to an existing waste receptacle by attachment axle 108 (sometimes called a secondary axle). While embodiments of the waste receptacle remote transporter discussed herein are generally discussed as having the motor wheels 104, 106 joined by an axle 102, it is to be appreciated that, in certain embodiments, the motor wheels 104, 106 may alternatively be mounted directly to a waste receptacle with no axle therebetween.

As illustrated in FIGS. 1-2, the primary axle 102 may has a first end and a second end. The primary axle 102 and may be attached at the first end to the first motor wheel 104 and at the second end to the second motor wheel 106. As shown in FIGS. 1 and 2, the first end and the second end of the primary axle 102 may terminate at an interior face 110 of each of the motor wheels 104, 106. It is, however, to be understood that in alternative embodiments, the primary axle 102 may pass through one or both motor wheels 104, 106 such that the first end and second end of the primary axle 102 terminate at or external relative to an outer face 112 of each of the motor wheels 104, 106.

Motor wheels, such as first motor wheel 104 and second motor wheel 106 shown in FIGS. 1 and 2 are spaced apart from one another by primary axle 102. In some embodiments, the motor wheels 104, 106 can further comprise a wheel component and a motor component. The motor wheels 104, 106 may be configured for forward and reverse driving and can be driven by a power source such as a battery, which may be connected to the motor wheels 104, 106 by cables such as electrical wiring cables 114. Batteries suitable for supplying power to the motor wheel will be discussed in greater detail below. In some embodiments, first motor wheel 104 and second motor wheel 106 may be independently controlled to allow the waste receptacle remote transporter 100 to be steered and driven by a remote user. In some embodiments, the remote user may manually input driving instructions such as turning, forwards movement, and backwards movement. In other embodiments, the movement and steering of the waste receptacle remote transporter 100 may be controlled by a computer program or algorithm without the need for manual input of specific instructions by the remote user.

With continued reference to FIG. 2, waste receptacle remote transporter 100 may further comprise first stabilizing arm 116 and second stabilizing arm 118. The stabilizing arms 116, 118 may have a proximal end and a distal end and can be joined or connected to the primary axle 102 by side brackets 120. In embodiments in which the first end and second end of the primary axle terminate at interior faces 110 of the motor wheels 104, 106, the side brackets 120 can be positioned at the ends of the primary axle 102 and disposed inwards relative to interior faces 110 of motor wheels 104, 106. In other embodiments in which the primary axle 102 passes through motor wheels 104, 106, the side brackets 120 can be disposed either inwards relative to interior faces 110 or outwards relative to outer faces 112 of motor wheels 104, 106.

While FIG. 2 shows the stabilizing arms 116, 118 attached to the side brackets 120 on a surface facing away from the motor wheels 104, 106, it is to be understood that in some embodiments, the stabilizing arms 116, 118 may be attached to the side brackets 120 on a surface facing towards the motor wheels 104, 106. While the embodiment illustrated in FIGS. 1 and 2 show a waste receptacle remote transporter with two stabilizing arms, it is to be appreciated that, in some embodiments, the stabilizing arms may be omitted, only one stabilizing arm may be included, or more than two stabilizing arms may be included.

In some embodiments, the waste receptacle remote transporter may further comprise one or more stabilizing wheels 122 attached the first stabilizing arm 116 and/or the second stabilizing arm 116. As best shown in FIG. 2, each of the stabilizing arms 116, 118 may have a stabilizing wheel 122 connected to the distal end of the arm. In such configurations, the stabilizing wheels 122 and the motor wheels 104, 106 together can form a stable contact base between waste receptacle remote transporter and the ground. While the embodiment shown in FIGS. 1 and 2 has only one stabilizing wheel 122 on each of the stabilizing arms 116, 118, it is to be understood that in other embodiments, multiple wheels may be attached to any or each of the stabilizing arms used. In some embodiments, including the embodiment shown in FIGS. 1 and 2, the one or more support wheels are attached to the one or more support arms on swivel mounts, but it is to be understood that they may be attached by any other suitable method. In embodiments in which the stabilizing arms have been omitted, the stabilizing wheels may alternatively be attached to a bottom surface of the waste receptacle.

Figure 5:
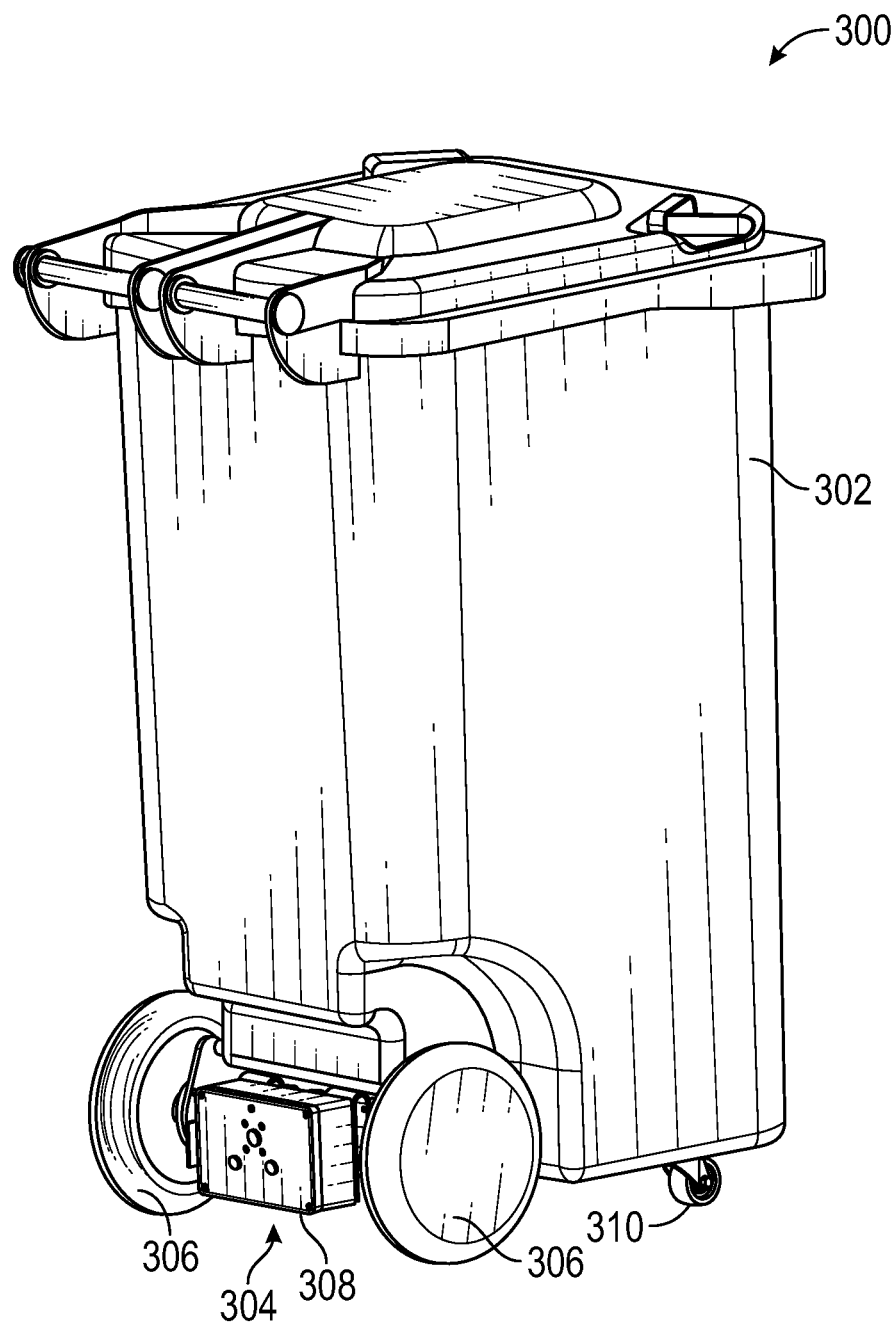
FIG. 5 illustrates a perspective view of an embodiment of a remotely positionable waste receptacle having a waste receptacle remote transporter.

The waste receptacle remote transporter 100 may further comprise an attachment axle. In such embodiments, such as the embodiment shown in FIGS. 1 and 2 attachment axle 108 can have a generally cylindrical shape having a first end and a second end. Attachment axle 108 may be attached at both ends to the side brackets 120. Attachment axle 108 can replace an existing axle of a wheeled waste receptacle, as illustrated in FIG. 5, such that waste receptacle remote transporter 100 can replace the axle and wheels of the existing receptacle. While attachment axle 108 is generally depicted as having a circular cross section, it is to be appreciated that, in alternative embodiments, attachment axle 108 may have a square cross section, a hexagonal cross section, or any other cross section geometry suitable for replacing the existing axle of a wheeled waste receptacle.

Returning to FIG. 1, the waste receptacle remote transporters disclosed herein may further comprise an electronics module. As shown in FIG. 1, waste receptacle remote transporter 100 may comprise electronics module 124. Electronics module 124 may contain one or more microprocessors and a power source. The microprocessors may be configured to control the motor wheels 104, 106, and may be connected to the motor wheels 104, 106 by electronic wiring cables 114. In some embodiments, the microprocessors may be configured to allow independent control of motor wheels 104, 106.

In some embodiments, as best seen in FIG. 2, the electronics module 124 may be attached to primary axle 102 by electronics module brackets 130. It is to be appreciated, however, that, in embodiments having a mounting axle and/or stabilizing brackets, electronics module 124 may be attached to alternative components, such as attachment axle 108 or the stabilizing arms 116, 118.

In some embodiments of the disclosed waste receptacle remote transporter, the electronics module may further comprise a two-way communication device. The two-way communication device is configured to receive remote user signals from a computing device, such as a computer, a cell phone, a tablet, or any other computing device having an internet connection and the ability to communicate wirelessly with the two-way communication device. In this way, a user is capable of remotely transmitting instructions, such as positioning and movement commands to the waste receptacle remote transporter. The two-way communications device may be any device suitable for the transmission of signals from the computing device to the electronics module, and from the electronics module to the computing device, such as a wireless connection, a radio transmitter and receiver, or a cellular transmitter and receiver. In some specific embodiments, the two-way communication may further comprise an antenna, such as a Wi-Fi antenna, a radio antenna, or a cellular antenna.

In some embodiments of the disclosed waste receptacle remote transporter 100, the electronics module may include one or more headlights. The one or more headlights may be controlled remotely by the user through signals, such as on/off commands, transmitted from the computing device to the two-way communications device, using the one or more microprocessors.

The electronics module may also include various instruments for monitoring the location of the waste receptacle remote transporter and the waste receptacle with which it is being used. For example, the electronics module may include a global positioning system ("GPS") module or a radio transponder. The GPS system or radio transponder can be configured to relay the position of the waste receptacle remote transporter via the one or more microprocessors and the two-way communication device. Location data may be transmitted to the computing device and communicated both to the user and to a waste collection service provider. Advantageously, this will allow for a user to quickly identify the location of the waste receptacle remote transporter and allow the waste collection service provider to easily determine the actual location of the waste receptacle remote transporter.

As shown in FIG. 1, the electronics module 124 of some embodiments of the disclosed waste receptacle remote transporter 100 may also include a camera 126. Camera 126 can be configured to return video data on the external embodiment to the user via the one or more microprocessors and the two-way communication device. Advantageously, this feature allows a remote user to identify obstacles or inclement weather conditions that may hinder or prevent the operation of the waste receptacle remote transporter 100. While FIG. 1 shows an embodiment of a waste receptacle remote transporter having a single camera, additional cameras may be installed to permit multiple simultaneous angles of viewing.

In some embodiments, the waste receptacle remote transporter 100 may further include one or more ultrasonic sensors. The ultrasonic sensors may be powered by the battery or power source of the electronics module 124, and may be configured to detect the proximity of the waste receptacle remote transporter 100 to objects or obstacles, and to transmit such information to the user through the one or more microprocessors and the two-way communication device. In this way, a remote user may become aware of obstacles that might interfere with or prevent the operation of the waste receptacle remote transporter 100 and adjust given instructions accordingly to avoid them.

In other embodiments, the waste receptacle remote transporter 100 can also include a compass to establish the bearing direction. The compass may also be configured to communicate bearing direction information to the user through the one or more microprocessors and the two-way communication device, thereby enabling a remote user to obtain information on the orientation of the waste receptacle remote transporter 100, in addition to location and proximity data, which may be useful in steering or controlling the waste receptacle remote transporter.

The various components of the waste receptacle remote transporter 100, such as the motor wheels, the microprocessors, the two-way communication device, the headlights, the GPS and/or radio location devices, the ultrasonic sensors, and/or the cameras, may be powered from a power source such as a battery. The battery may be any type of battery suitable for powering the various components of the waste receptacle remote transporter 100, such as a lithium-ion battery, a nickel-metal hydride battery, a nickel-cadmium battery, or an alkaline battery. The battery may be housed in the electronics module 124, or on any other suitable component of the waste receptacle remote transporter 100.

Figure 6:
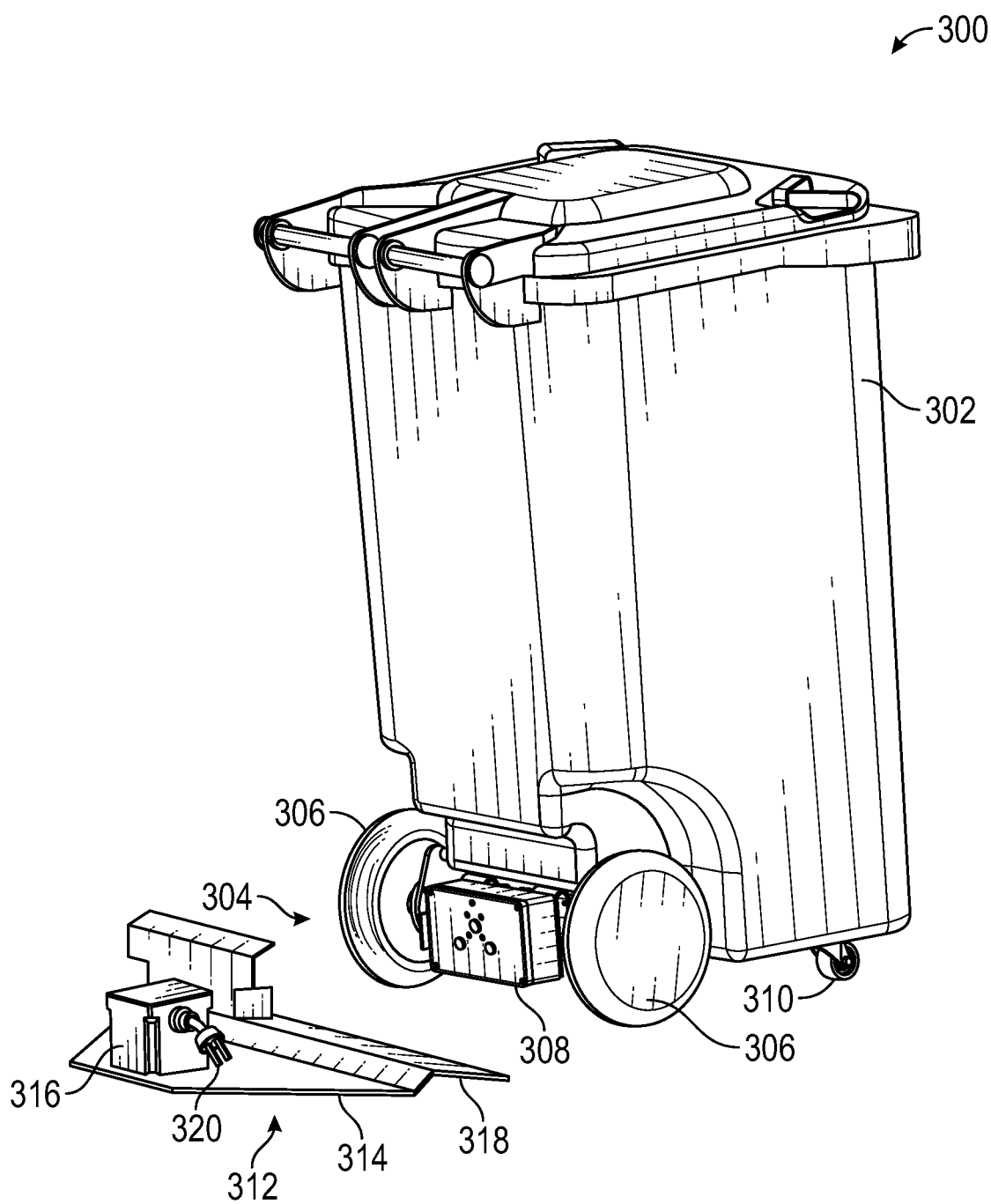
FIG. 6 illustrates the remotely positionable waste receptacle of FIG. 5 having also a docking station with an electrical charger.

The battery may be further configured to connect with a charging station. One example charging station is illustrated in FIG. 6, which shows electrical charging station configured to connect with and charge a battery when the waste receptacle remote transporter is at the waste disposal location. As best illustrated in FIG. 1, the waste receptacle remote transporter 100 can include one or more charging contacts 128. The one or more charging contacts 128 can be configured to connect with one or more reciprocal charging contacts on a charging station such as the charging station illustrated in FIG. 6. In some embodiments, as shown in FIG. 1, the charging contacts may be located on the electronics module 124, however it is to be understood that the charging contacts may be located on any suitable component of the waste receptacle remote transporter 100. In embodiments in which the charging contacts are not located on the electronics module, they may be connected to the battery by electrical cables or wires.

Figure 3:
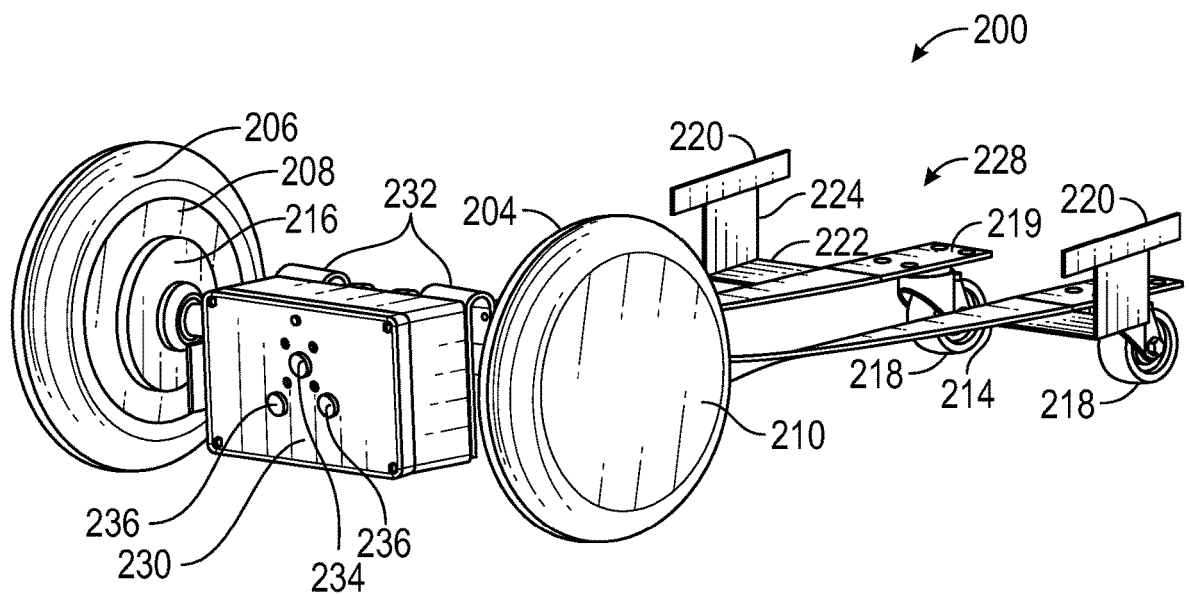
FIG. 3 illustrates a front perspective view of a waste receptacle remote transporter according to another disclosed embodiment.
Figure 4:
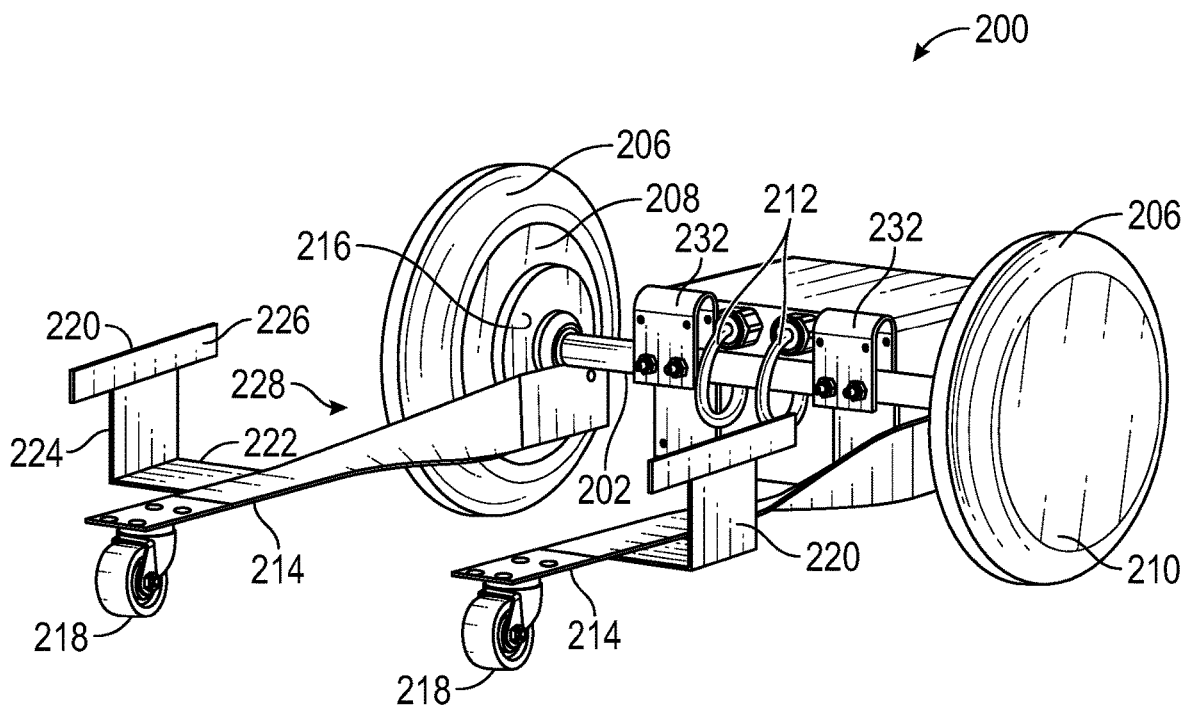
FIG. 4 illustrates a rear perspective view of the waste receptacle remote transporter of FIG. 3.

In some alternative embodiments, the waste receptacle remote transporter may be configured to be separate from the waste receptacle that is transported. Such embodiments allow a remote waste receptacle remote transporter to be used with multiple waste receptacles, including those that lack wheels or an axle that might be replaced, e.g., by secondary axle 108 of waste receptacle remote transporter 100, as illustrated in FIGS. 1-2. Such an embodiment may, accordingly, omit the secondary axle in favor of other means of waste receptacle attachment. One alternative embodiment of a waste receptacle remote transporter 200 is shown in FIGS. 3-4. The waste receptacle remote transporter 200 comprises a primary axle 202, a first motor wheel 204, a second motor wheel 206, and a power source.

As illustrated in FIGS. 3 and 4, the primary axle 202 has a first end and a second end. The primary axle 202 may be attached at the first end to the first motor wheel 204 and at the second end to the second motor wheel 206. As shown in FIGS. 3 and 4, the first end and the second end of the primary axle 202 may terminate at an interior face 208 of each of the motor wheels 204, 206, however it is to be understood that in some embodiments, primary axle 202 may pass through one or both motor wheels 204, 206 such that the first end and second end of the primary axle 202 terminate at or external relative to an outer face 210 of any of the motor wheels 204, 206

Motor wheels, such as first motor wheel 204, and second motor wheel 206 as shown in FIGS. 3 and 4 can be spaced apart by the primary axle 202. They may be configured for forward and reverse driving and can be driven by a power source such as a battery. The battery may be connected to the motor wheels 204, 206 by cables such as electrical cables 212. Batteries suitable for supplying power to the motor wheels 204, 206 may be substantially the same as the batteries disclosed for use with waste receptacle remote transporter 100 discussed above and will be discussed in further detail below. In some embodiments, first motor wheel 204 and second motor wheel may be independently controlled to allow the waste receptacle remote transporter 200 to be steered and driven by a remote user. In some embodiments, the remote user may manually input driving instructions such as turning, forwards movement, and backwards movement. In other embodiments, the driving control of the waste receptacle remote transporter 200 may be controlled by a computer program or algorithm without the need for driving instructions from the remote user.

With continued reference to FIG. 4, the waste receptacle remote transporter 200 may further comprise stabilizing arms 214. Stabilizing arms 214 can have a proximal end and a distal end and can be attached to primary axle 202 by side brackets 216 at the proximal end. In embodiments in which the first end and the second end of the primary axle 202 terminate at interior faces 208 of the motor wheels 204, 206, the side brackets 216 can be positioned at the ends of the primary axle 202 and disposed inwards relative to the interior faces 208 of the motor wheels 204, 206. In other embodiments in which the primary axle 202 passes through the motor wheels 204, 206, the side brackets 216 can be disposed either inwards relative to the interior faces 208 or outwards relative to the outer faces 210 of the motor wheels 204, 206.

While FIGS. 3 and 4 show the stabilizing arms 214 attached to the side brackets 216 on a surface facing away from the motor wheels 204, 206, it is to be understood that in some embodiments, the stabilizing arms 214 may be attached to the side brackets 216 on a surface facing towards the motor wheels 204, 206. While the embodiment illustrated in FIGS. 3 and 4 shows a waste receptacle remote transporter having two stabilizing arms, it is to be appreciated that in some embodiments, a different number of stabilizing arms such as one stabilizing arm or more than two stabilizing arms may be included.

In some embodiments, the waste receptacle remote transporter 200 may further comprise one or more stabilizing wheels 218 attached to the stabilizing arms 214. As best shown in FIG. 4, the stabilizing arms 214 may have a stabilizing wheel 218 attached to the distal end (i.e. attached at the end opposite to where the stabilizing arms 214 are attached to the side brackets 216) of the stabilizing arm. In such configurations, the stabilizing wheels 218 and the motor wheels 204, 206 together can form a stable contact base between the waste receptacle remote transporter 200 and the ground. While the embodiment shown in FIGS. 1 and 2 has only one stabilizing wheel 218 on each stabilizing arm 214, it is to be understood that in other embodiments, multiple wheels may be attached to any or all of the stabilizing arms included. In some embodiments, including the embodiment shown in FIGS. 3 and 4, the one or more support wheels are attached to the one or more support arms on swivel mounts, but it is to be understood that they may be attached by any other suitable method.

In some embodiments, the waste receptacle remote transporter 200 may optionally comprise one or more lateral restraints (sometimes called side restraints or side brackets). As show in FIGS. 3 and 4, one or more lateral restraints 220 may be attached to the stabilizing arms 214. Lateral restraints 220 generally comprise an orthogonal horizontal member 222, a vertical member 224, and a parallel horizontal member 226. In one exemplary configuration for a lateral restraint 220, best shown in FIG. 4, the orthogonal horizontal member 222 can extend outwards from the stabilizing arms 214, (i.e leftwards from the leftmost stabilizing arm and rightwards from the rightmost stabilizing arm). Typically, the orthogonal horizontal member may be substantially parallel to the ground, as shown in FIGS. 3 and 4, but it is to be appreciated that in some embodiments, it may be positioned at an angle relative to the ground. Vertical member 224 can have a lower end and an upper end. The lower end of vertical member 224 be attached to orthogonal horizontal member 222, and vertical member 224 can extend upwards therefrom, as shown in FIG. 4. Parallel horizontal member 226 can be attached to an upper end of vertical member 224 and can extend forwards or backwards therefrom in the direction of the stabilizing arms 214.

The lateral restraints 220, the primary axle 202, and the stabilizing arms 214, as illustrated in FIGS. 3 and 4, can define a containment space 228. In the illustrated embodiment, the bottom of the containment space may be defined by the stabilizing arms 214, and the left and right sides of the containment space 228 may be defined by the lateral restraints 220, and the back of the containment space 228 can be defined by the primary axle 202. While FIGS. 3 and 4 depict embodiments of waste receptacle remote transporter 200 having a containment space 228 defined only by the lateral restraints 220, the primary axle, and the stabilizing arms 214, it is to be appreciated that in alternative embodiments, the containment space 228 may be further defined by additional elements. For example, in one alternative embodiment, the distal ends of the stabilizing arms 214 could further comprise vertical projections that restrict the forward motion of a waste receptacle and define a forward boundary of the containment space 228. In this way, the waste receptacle remote transporter 200 can be used with a variety of waste receptacles, so long as the area or "footprint" of the waste receptacle is smaller in each dimension than the waste receptacle containment space 228 defined by the lateral restraints 220 and the stabilizing arms 214.

Lateral restraints 220 can be configured to brace or support the sides of a waste receptacle, and to constrain the lateral movement of the waste receptacle. In certain embodiments, the spacing of the lateral restraints 220 can be configured to be adjusted according to the dimensions of the waste receptacle to be constrained, for example to allow wider or narrower waste receptacles to be contained in the waste receptacle containment space 228 defined by the lateral restraints 220 and the stabilizing arms 214.

With continued reference to FIG. 3, the waste receptacle remote transporter 200 disclosed herein may further comprise an electronics module 230 mounted to primary axle 202 by electronics module brackets 232. Electronics module 230 may contain one or more microprocessors and a power source. The microprocessors may be configured to control the motor wheels 204, 206, and may be connected to the motor wheels 204, 206 by electrical cables 212. In some embodiments, the microprocessors may be configured to allow independent control of motor wheels 204, 206.

In some embodiments of the disclosed waste receptacle remote transporter 200, the electronics module 230 may further comprise a two-way communication device. The two-way communication device may be configured to receive remote user signals from a computing device, such as a computer, a cell phone, a tablet, or any other computing device having an internet connection and the ability to communicate wirelessly with the two-way communication device. In this way, a user is capable of remotely transmitting instructions, such as positioning and movement commands to the waste receptacle remote transporter. The two-way communications device may be any device suitable for the transmission of signals from the computing device to the electronics module, and from the electronics module to the computing device, such as a wireless connection, a radio transmitter and receiver, or a cellular transmitter and receiver. In some specific embodiments, the two-way communication may further comprise an antenna, such as a Wi-Fi antenna, a radio antenna, or a cellular antenna.

In some embodiments of the disclosed waste receptacle remote transporter 200, the electronics module 230 may include one or more headlights. The one or more headlights may be controlled remotely by the user through signals, such as on/off commands, transmitted from the computing device to the two-way communications device, using the one or more microprocessors.

The electronics module 230 may also include various instruments for monitoring the location of the waste receptacle remote transporter and the waste receptacle with which it is being used. For example, the electronics module may include a global positioning system ("GPS") module or a radio transponder. The GPS system or radio transponder can be configured to relay the position of the waste receptacle remote transporter via the two-way communication device. Location data may be transmitted to the one or more microprocessors and communicated both to the user and to a waste collection service provider. Advantageously, this will allow for a user to quickly identify the location of the waste receptacle remote transporter and allow the waste collection service provider to easily determine the actual location of the waste receptacle remote transporter.

As shown in FIG. 3, the electronics module 230 of some embodiments of the disclosed waste receptacle remote transporter 200 may also include a camera 234. Camera 234 can be configured to return video data on the external embodiment to the user via the one or more microprocessors and the two-way communication device. Advantageously, this feature allows a remote user to identify obstacles or inclement weather conditions that may hinder or prevent the operation of the waste receptacle remote transporter 200. While FIG. 3 shows an embodiment of a waste receptacle remote transporter having a single camera, additional cameras may be installed to permit multiple simultaneous angles of viewing.

In some embodiments, the waste receptacle remote transporter 200 may further include one or more ultrasonic sensors. The ultrasonic sensors may be powered by the battery or power source of the electronics module 230, and may be configured to detect the proximity of the waste receptacle remote transporter 200 to objects or obstacles, and to transmit such information to the user through the one or more microprocessors and the two-way communication device. In this way, a remote user may become aware of obstacles that might interfere with or prevent the operation of the waste receptacle remote transporter 200 and adjust given instructions accordingly to avoid them.

In other embodiments, the waste receptacle remote transporter 200 can also include a compass to establish the bearing direction. The compass may also be configured to communicate bearing direction information to the user through the one or more microprocessors and the two-way communication device, thereby enabling a remote user to obtain information on the orientation of the waste receptacle remote transporter 200, in addition to location and proximity data, which may be useful in steering or controlling the waste receptacle remote transporter.

The various components of the waste receptacle remote transporter 200, such as the motor wheels, the microprocessors, the two-way communication device, the headlights, the GPS and/or radio location devices, the ultrasonic sensors, and/or the cameras, may be powered from a power source such as a battery. The battery may be any type of battery suitable for powering the various components of the waste receptacle remote transporter 200, such as a lithium-ion battery, a nickel-metal hydride battery, a nickel-cadmium battery, or an alkaline battery. The battery may be housed in the electronics module 230, or on any other suitable component of the waste receptacle remote transporter 200. As illustrated in FIG. 3, the electronics module 230 can include one or more charging contacts 236. The one or more charging contacts 236 can be configured to connect with one or more reciprocal charging contacts on a charging station such as the charging station illustrated in FIG. 6.

Advantageously, embodiments of a waste receptacle remote transporter 200 according to the present disclosure, being separate from the waste receptacle to be transported, may be used with more than one waste receptacle. This offers the advantages, for example, of allowing a single device to move multiple waste receptacles from a waste disposal location to a waste collection location, by transporting first one waste receptacle, and then another until all waste receptacles have been transported to the waste collection location.

Also disclosed herein are embodiments of waste receptacle assemblies having a waste receptacle remote transporter. Various embodiments of such waste receptacle assemblies, as previously discussed, can have the waste receptacle remote transporter removably attached. In alternative embodiments, however, the waste receptacle assembly can have the waste receptacle remote transporter can be integrally formed with the waste receptacle to form the waste receptacle assembly.

An example waste receptacle assembly 300 with a waste receptacle remote transporter is shown in FIGS. 5 and 6. As shown in FIG. 5, waste receptacle assembly 300 comprises a waste receptacle 302 and a waste receptacle remote transporter 304. While FIG. 5 shows a waste receptacle assembly 300 in which the waste receptacle 302 is a dumpster, it is to be appreciated that any waste receptacle for the disposal or recycling of waste materials can be used in the waste receptacle assembly 300.

The waste receptacle remote transporter 304 can be any waste receptacle remote transporter embodiment previously disclosed herein, and furthermore may be either removably attached to or integrally formed with the waste receptacle 302. In the waste receptacle assembly illustrated in FIG. 5, waste receptacle remote transporter may comprise one or more motor wheels 306, an electronics module 308, and one or more support wheels 310.

With continued reference to FIG. 5, the motor wheels 306 can be spaced apart by a primary axle and configured for forward and reverse driving when supplied with power from a power source. The power source may be a battery or any other suitable power source such as power source embodiments previously discussed. The power source may be connected to the motor wheels 306 by electrical cables. In some embodiments, the motor wheels 306 may be independently controlled to allow the waste receptacle remote transporter 304 to be steered and driven by a remote user. In certain embodiments, the remote user may manually input driving instructions such as turning, forwards movement, and backwards movement. In other embodiments, the driving control of the waste receptacle remote transporter 304 may be controlled by a computer program or algorithm without the need for driving instructions from the remote user.

As shown in FIGS. 5 and 6, the waste receptacle assembly 300 may further comprise one or more support wheels 310. The one or more support wheels 310 may be attached to one or more support arms of the waste receptacle remote transporter. The one or more support arms may be configured to support a bottom surface of the waste receptacle 302, with the one or more support wheels 310 in contact with the ground. In some embodiments, including the embodiment shown in FIGS. 5 and 6, the one or more support wheels are attached to the one or more support arms on swivel mounts, but it is to be understood that they may be attached by any other suitable method.

As shown in FIG. 5, the waste receptacle remote transporter 304 may include an electronics module 308. The electronics module 308 can comprise the power source, a two-way communications device, and one or more microprocessors. The electronics module can, in some embodiments, also comprise any or all of a GPS device, one or more video cameras, one or more headlights, or one or more ultrasonic distance sensors. In some embodiments, any or all of the GPS device, the video cameras, the headlights, or the one or more ultrasonic distance sensors may be in electronic communication with the one or more microprocessors. The one or more microprocessors may further be configured both to control the motor wheels, as well as any or all of the GPS device, the video cameras, the headlights, or the one or more ultrasonic distance sensors, and to receive data therefrom.

The two-way communications device of electronics module 308 can be configured to receive and transmit data to one or more computerized components. In some embodiments, the two-way communications device can be a Wi-Fi transmitter or a radio transmitter, however it is to be appreciated that other two-way communications devices suitable to sending and receiving data signals may be used instead. The two-way communications device can be configured to send and receive data signals to and from one or more computerized devices. The one or more computerized devices can be configured to allow for command inputs from a remote human user to be sent to the one or more microprocessors of the electronics module by way of the two-way communications device, and for data collected by the one or more microprocessors to be sent to the remote human user by way of the two-way communications device and the one or more computerized devices. Advantageously, this permits the remote human user to adjust the commands given to the waste receptacle remote transporter while it is in use.

Turning now to FIG. 6, in some embodiments, the waste receptacle assembly 300 can further include a stationary charging dock, 312. Stationary charging dock 312 can further comprise a parking platform 314 and an electrical charger 316. Parking platform 314 can be placed at a waste disposal location and configured to receive the one or more motor wheels 306 of the waste receptacle assembly 300 when the waste receptacle assembly is at the waste disposal location. As illustrated in FIG. 6, for example, the parking platform 314 can include an angled ramp 318 configured to releasably engage with the one or more motor wheels 306 when the waste receptacle assembly 300 is at rest at the waste disposal location. The electrical charger 316, as shown in FIG. 6. can further comprise electrical plug 320 and can be configured to be connected to a battery in the electronics module 308 when the waste receptacle assembly 300 is positioned in the stationary charging dock 312.

Figure 7A:
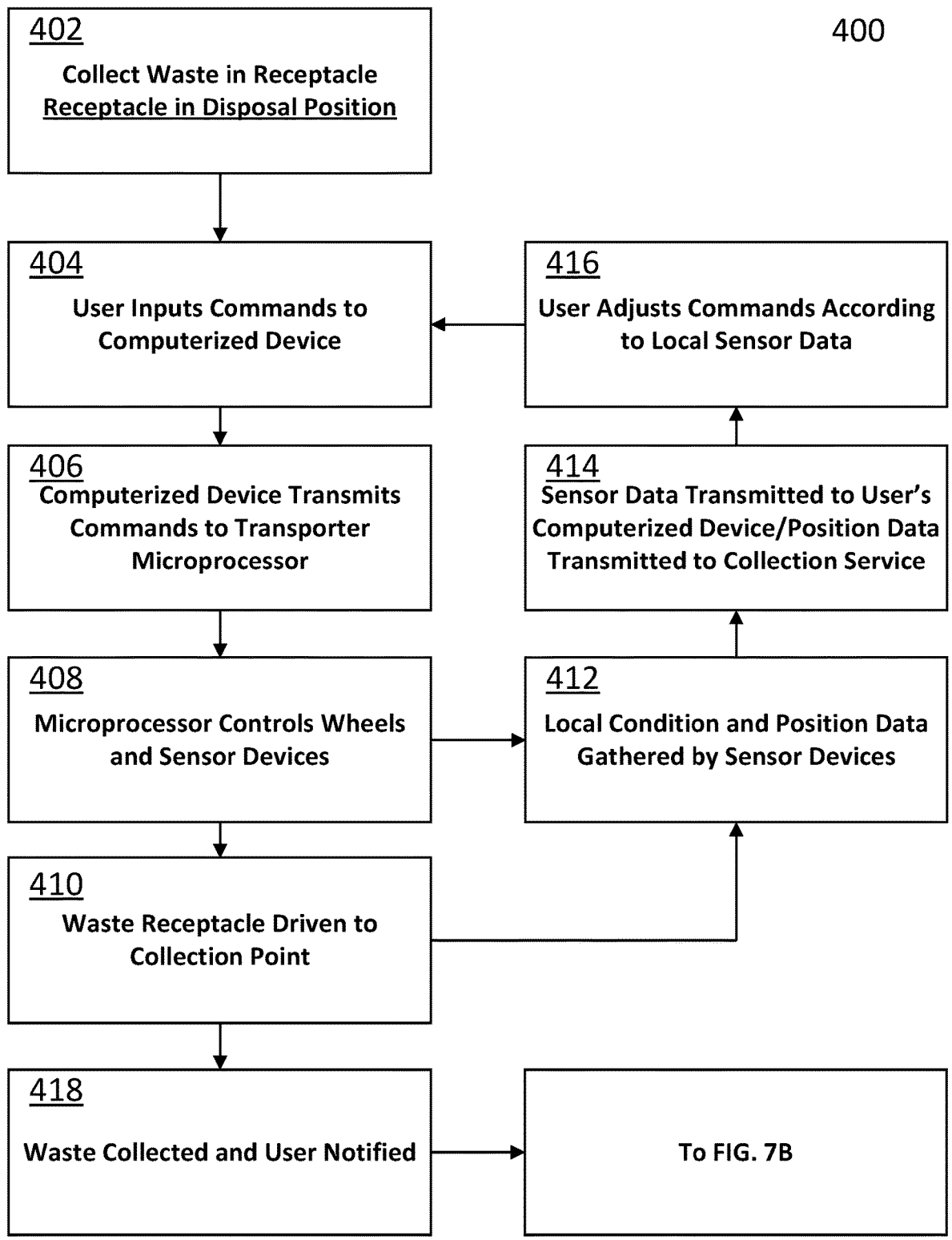
FIGS. 7A and 7B are flow charts illustrating exemplary methods of remotely disposing of waste materials using the remotely positionable waste receptacles disclosed herein.
Figure 7B:
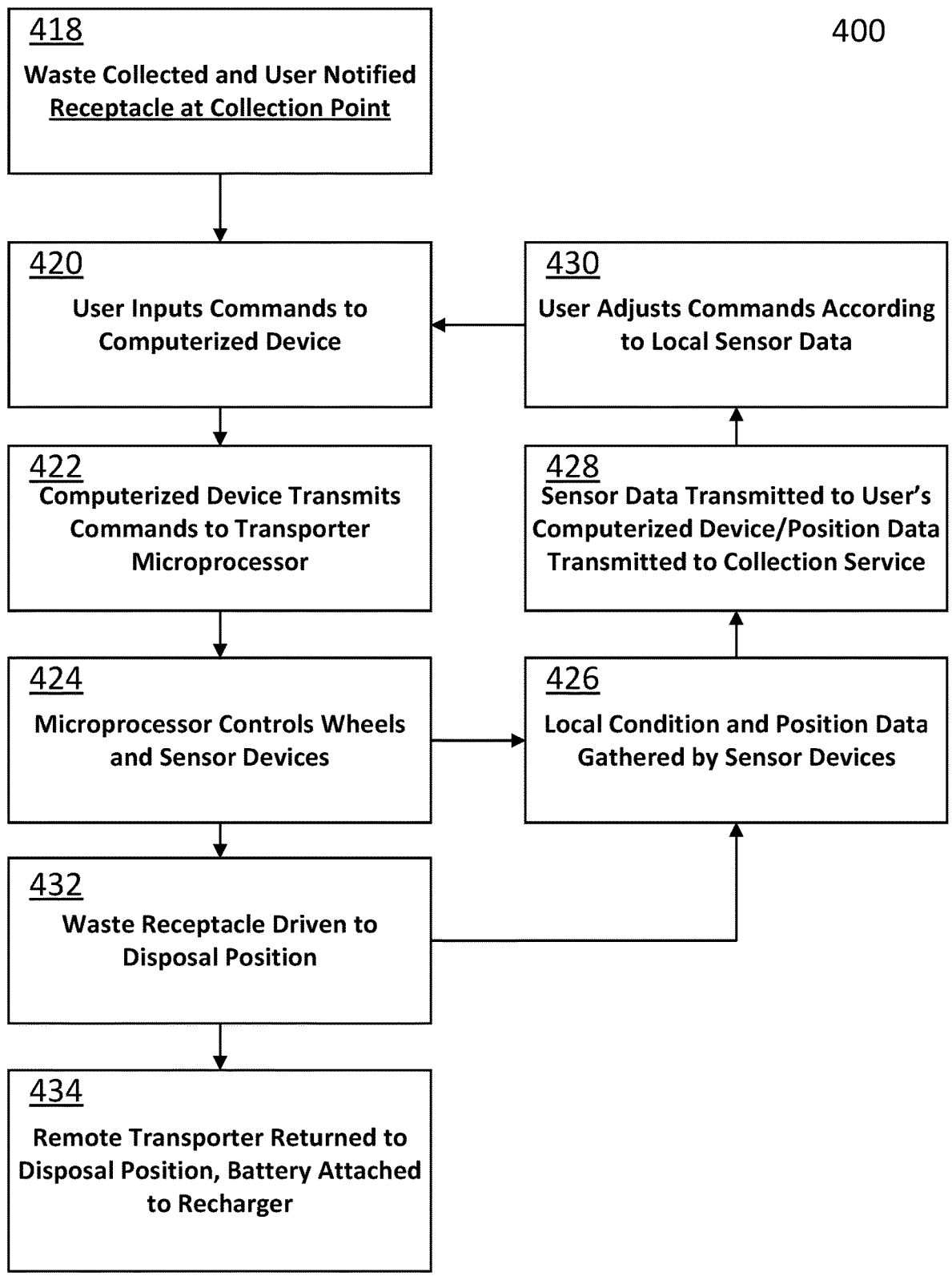

Also disclosed herein are methods for the use of a waste receptacle having a waste receptacle remote transporter. One general method of use of a waste receptacle having a waste receptacle remote transporter, remote waste disposal method 400, is schematically outlined in FIGS. 7A and 7B. As shown in FIG. 7A. In remote waste disposal method 400, a waste receptacle having a remote transporter begins in a waste disposal position, sited for the convenience of the user when disposing of waste materials (process block 402).

When a remote human user decides to move the waste receptacle to a collection location, such as might occur in advance of a designated waste collection or recycling collection day, the remote human user may input a first set of command inputs into a computerized device (process block 404). This first set of command inputs can then be communicated to the waste receptacle remote transporter via a two-way communications device configured to transmit signals from the computerized device to one or more microprocessors of the waste receptacle remote transporter, and to transmit signals from the microprocessors of the waste receptacle remote transporter to the computerized device (process block 406).

When the first set of command inputs are received by the one or more microprocessors of the waste receptacle remote transporter, the microprocessors may, based on the first set of command inputs, activate one or more motor wheels of the waste receptacle remote transporter, activate any number of sensors such as video cameras, proximity sensors, global positioning satellite devices, record data from any of the activated sensors, turn on headlights, or any combination thereof (process blocks 408, 410). Simultaneously, the two-way communication device may allow the data gathered by any of the activated sensors to be communicated to the remote human user via the computerized device (process block 412). In some embodiments, the location of the waste receptacle having a remote transport device may be transmitted to a waste collection company, allowing for easy collection of the waste materials in the waste receptacle (process block 412). Based on the sensor data transmitted by the two-way communication device, the remote human user may adjust the first set of command inputs given to adjust for local conditions, such as to avoid obstacles or difficult terrain, or to readily discern the exact location of the waste receptacle (process block 414).

The first set of command inputs given by the remote human user may in this way be used to drive the waste receptacle having a remote transporter to a designated collection point or collection location (process block 416). When the waste receptacle is at the collection point, the waste may be collected by a waste collection service provider (process block 418). In some exemplary remote waste disposal methods, the waste collection service provider can notify the remote human user that the waste materials have been collected (process block 418).

When the remote human user receives notification that the waste materials have been collected, or when the designated collection time has passed, the remote human user may deliver a second set of command inputs to direct the waste receptacle with a remote transporter to return to the waste disposal position (process block 420). This second set of command inputs can be transmitted to the microprocessor of the waste receptacle remote transporter via the two-way communications device (process block 422).

When the second set of command inputs is received by the one or more microprocessors of the waste receptacle remote transporter, the microprocessors may, based on the second set of command inputs, activate one or more motor wheels of the waste receptacle remote transporter, activate any number of sensors such as video cameras, proximity sensors, global positioning satellite devices, record data from any of the activated sensors, turn on headlights, or any combination thereof (process blocks 424, 426). Simultaneously, the two-way communication device may allow the data gathered by any of the activated sensors to be communicated to the remote human user via the computerized device (process block 428). Based on the sensor data transmitted by the two-way communication device, the remote human user may adjust the second set of command inputs given to adjust for local conditions, such as to avoid obstacles or difficult terrain, or to readily discern the exact location of the waste receptacle (process block 430).

The second set of command inputs given by the remote human user may in this way be used to drive the waste receptacle having a remote transporter to a designated waste disposal point or disposal location (process block 432). When the waste receptacle has been returned to the waste disposal point, the power source of the waste receptacle remote transporter can be connected to a recharging device (process block 432). Thus, the waste receptacle with a remote transporter may be returned to a position that makes waste disposal convenient for the remote user, and the power source may be recharged for the next operational cycle of the waste receptacle remote transporter.

In this way, the process of collecting waste or recyclable materials may be accomplished without the need for local human interfacing. Advantageously, this avoids the challenges associated with moving a heavy waste receptacle through manual effort and may be done by a remote human user at any location from which a computerized device may be used to communicate with the waste receptacle remote transporter.

Figure 8:
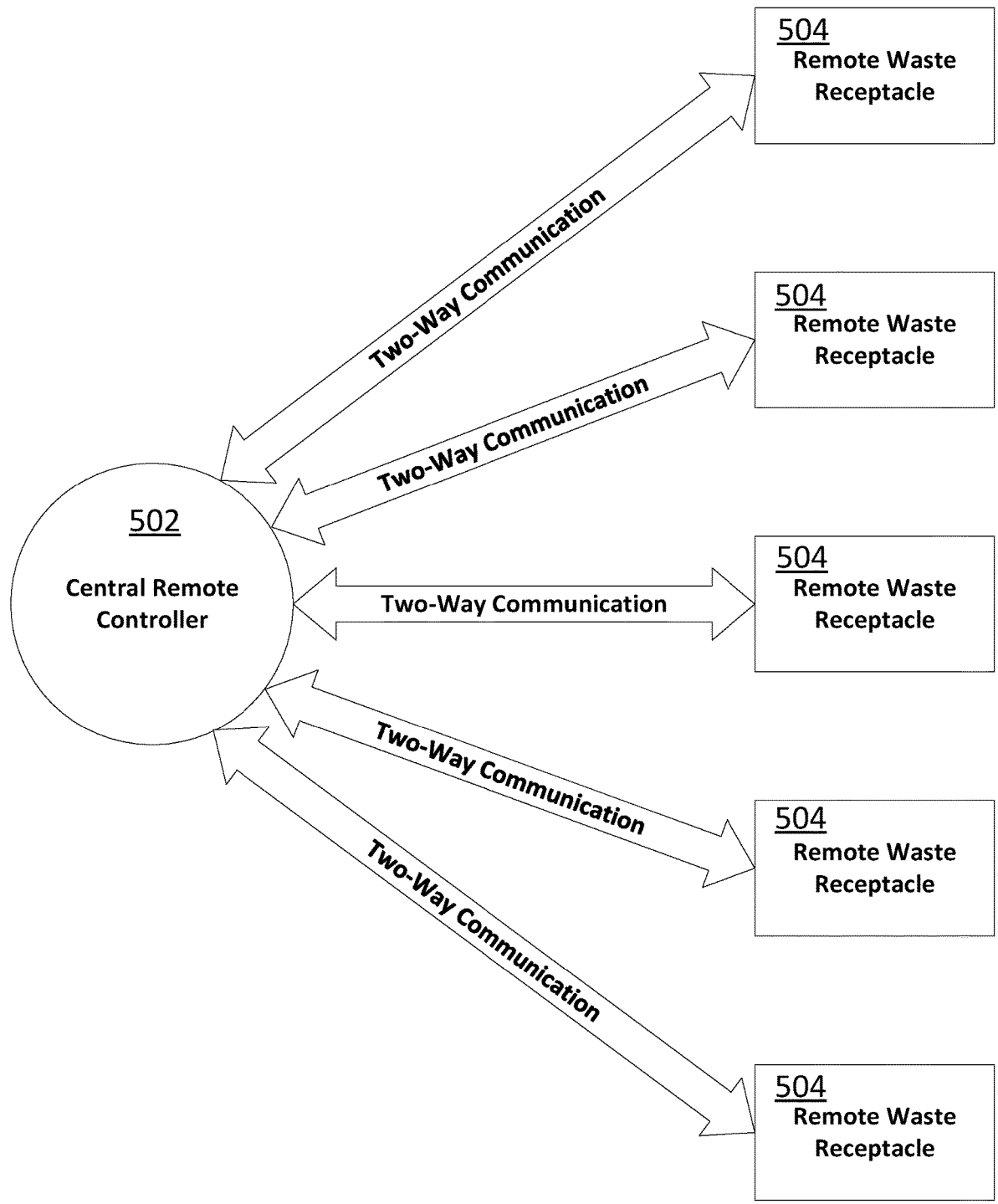
FIG. 8 is a schematic illustration of a remote central controller simultaneously controlling multiple remote waste receptacles.

In an alternative method embodiment, a single controller may control multiple waste receptacles having remote transporters. As conceptually illustrated in FIG. 8, in centrally-controlled multiple waste receptacle control method 500, a single domestic or commercial user, or a single waste collection service provider may provide a central remote controller 502. Central remote controller 502 can be in simultaneous two-way communication with a plurality of remote waste receptacles 504.

Figure 9:
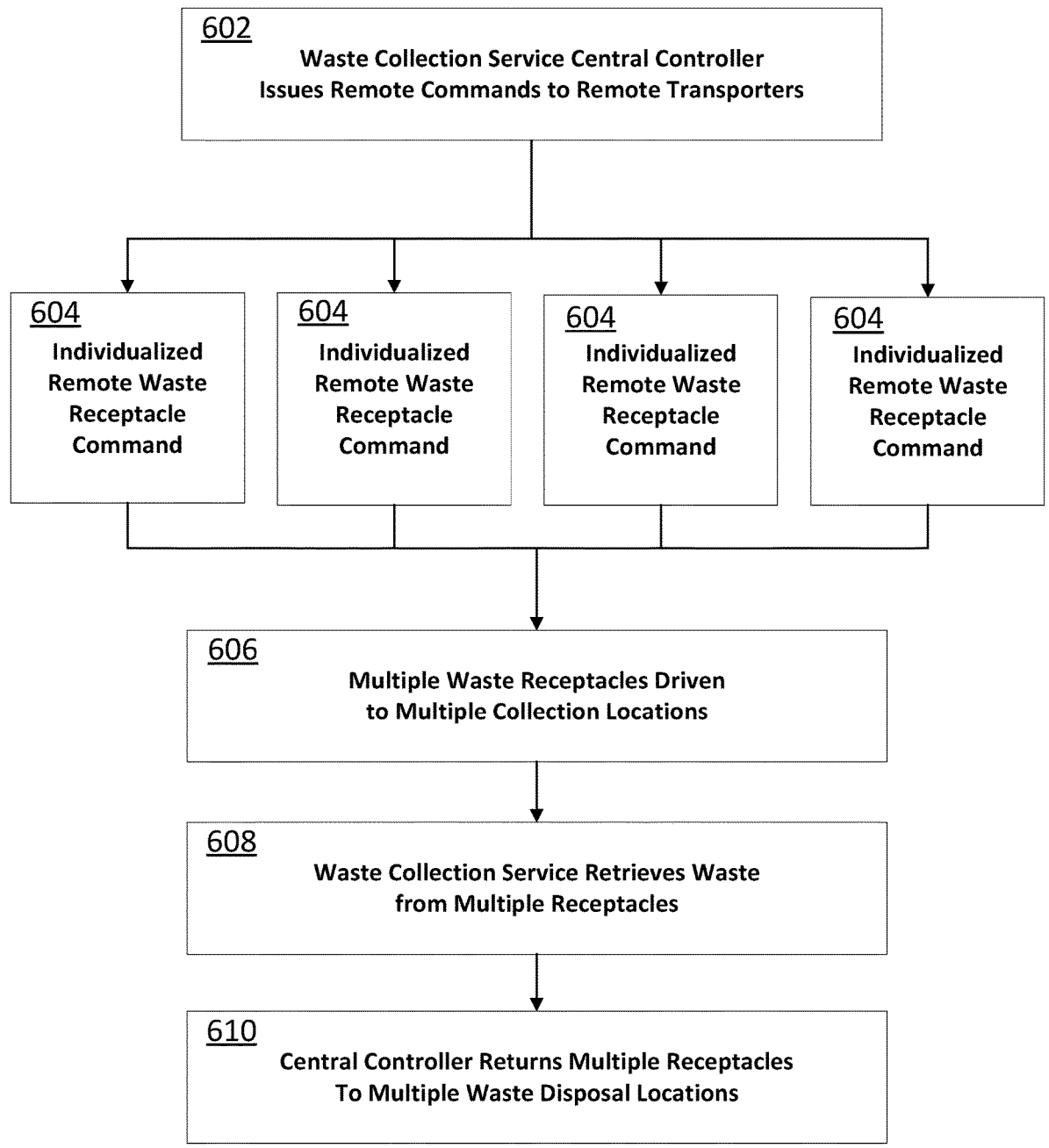
FIG. 9 is a flow chart illustrating an exemplary method of remotely collecting waste from multiple waste receptacles controlled by a central controller.

This alternative method embodiment can be used to facilitate a centralized remote waste collection service, or to allow a single commercial or domestic user to remotely operate multiple waste receptacles having remote transporters. For example, in remote waste collection service 600, illustrated in FIG. 9, a service provider can, using a centrally-controlled multiple waste receptacle control method, such as centrally-controlled multiple waste receptacle control method 500, issue commands from a central controller to multiple waste receptacle remote transporters in two-way communication with the central controller (process block 602). Each waste receptacle can receive individualized commands under the direction of the central controller, using, for example, the steps of remote waste disposal method 400 (process blocks 604), and can thereby be driven to multiple collection locations (process block 606). Waste materials can then be collected by the waste collection service provider from the multiple waste receptacles (process block 608). Once the waste materials have been collected, the multiple waste receptacles can be returned to multiple disposal locations through individualized commands under the direction of the central controller, using, for example, the steps of remote waste disposal method 400 (process block 610).

The waste receptacles having remote transporters disclosed herein can be used with various large-scale waste collection applications, such as those detailed below. In one potential application, the waste receptacle remote transporter could be provided by a user intending to deliver a waste receptacle to a pickup point, and such a receptacle could be provided by a waste collection service provider, which also periodically collects the receptacle and carries away the waste within. Such receptacles may be provided for users at residential as well as commercial locations.

The user may attach a waste receptacle remote transporter, such as those described above, to the waste receptacle provided by the waste collection company. In the case of wheeled waste receptacles, the native axle and wheels may be removed and a waste receptacle remote transporter, such as waste receptacle remote transporter 100 may be substituted in their place, with the stabilizing arms positioned underneath the bottom of the waste receptacle.

In the case of waste receptacles without wheels, such as flat-bottomed recycling crates or wheel-less garbage cans, a waste receptacle remote transporter such as waste receptacle remote transporter 200 can be secured to the waste receptacle by placing the receptacle on top of the stabilizing arms. In embodiments having lateral restraints attached to the stabilizing arms, such as lateral restraints 220 of waste receptacle remote transporter 200, these brackets may be tightened against the sides of the waste receptacle to secure it to the waste receptacle remote transporter 200.

The waste receptacle remote transporter may then be connected to a computing device such as a computer, cell phone, or table, through the two-way communicator, enabling remote user control over the waste receptacle remote transporter whenever the remote user can log into the computing device.

The waste receptacle having an attached waste receptacle remote transporter can thereafter be stored in a first location or disposal point convenient for allowing the user to deposit waste materials in the waste receptacle. For convenience, a charging station for charging the battery or power source of the waste receptacle remote transporter can be installed at the first location, allowing the battery or power source to be charged any time that the waste receptacle remote transporter is at the first location.

On days designated for waste collection company collection of the waste in the waste receptacle, the remote user can then use an electronic device such as a computer, cell phone, or tablet to drive the waste receptacle and waste receptacle remote transporter to a second location or collection point designated for waste pickup, such as a curb, sidewalk, or edge of a street. Signals from the electronic device may be transmitted to the waste receptacle remote positioning device through the two-way communicator, and feedback information such as obstacle proximity data, live camera feed data, and/or GPS positioning data may be returned from the waste receptacle remote positioning device to the user through the electronic device, allowing the remote user to view camera feeds, proximity data, and location of the waste receptacle, and adjust the commands given to the waste receptacle remote transporter according to local conditions.

When the waste has been collected by the waste collection service provider, notification can be sent to the remote user, for example, by email, text message, or app notification. The remote user can then drive the waste receptacle remote positioning device back to the first position, where the one or more charging contacts of the waste receptacle remote positioning devices may connect with the corresponding contacts of the charging station.

In this fashion, the process of taking the waste receptacle to the collection point can be conducted without any need for the user to physically interact with the waste receptacle, and can be done by a remote user at any location from which the remote user can access the computerized device. Advantageously, this permits users who are not on-site at the residential or commercial property to deliver waste from the disposal point to the collection point. Furthermore, because there is no need for any user to push, pull or carry the waste receptacle to the collection point, even very heavy waste receptacles can be moved to the collection point without endangering the user In an alternative application of the waste receptacle remote transporter embodiments disclosed herein, multiple waste receptacle remote transporters could be provided by the waste collection service provider as part of an integrated waste collection service. Multiple waste receptacle remote transporters could be installed within the same collection network, and centrally controlled by the waste collection service provider, which could operate each waste receptacle remote transporter from a single computerized device.

Such waste receptacles could, in some applications, be provided independently of the waste receptacles, and configured for use with a customer's existing waste receptacles. In other applications, the waste collection service provider could provide waste receptacles having a waste receptacle remote transporter integrally included. In such an application, a method of remote waste disposal, such as that illustrated in FIGS. 8-9 may be particularly advantageous.

The waste collection service provider could direct each of the waste receptacle remote transporters to its respective collection point without any need for input from the domestic or commercial waste collection service user. When the waste from each waste receptacle has been collected, a notification could be given to the waste collection service provider and the waste collection service provider could direct each waste receptacle remote transporter to its respective disposal and charging point.

In this way, need for weekly input from the residential and commercial waste collection service users could be eliminated for increased convenience and service user safety.

Additional Examples of Disclosed Technology

In view of the above described implementations of the disclosed subject matter, this application discloses the additional examples enumerated below. It should be noted that one feature of an example in isolation or more than one feature of the example taken in combination and, optionally, in combination with one or more features of one or more further examples are further examples also falling within the disclosure of this application.

Example 1. A waste receptacle remote transport device, comprising a first axle assembly, a waste receptacle attachment feature, a power source, and an electronics module. The first axle assembly has a first axle, one or more wheels configured to move and steer the waste receptacle remote transport device, and one or more motor components configured to rotate the one or more wheels. The waste receptacle attachment feature is configured to removably attach the waste receptacle remote transport device to a waste receptacle. The power source is configured to supply power to the one or more motor components. The electronics module further comprises one or more microprocessors and a two-way communications device. The one or more microprocessors are configured to control the one or more motor component. The two-way communications device is configured to receive input commands from a human user through a computerized device, to relay the input commands to the one or more microprocessors, to receive data from the microprocessor, and to transmit data from the microprocessor to the human user through the computerized device.

Example 2. The waste receptacle remote transport device of any example herein, particularly example 1, wherein the waste receptacle attachment feature is a second axle running parallel to and coupled to the first axle and configured to replace a native axle of a waste receptacle.

Example 3. The waste receptacle remote transport device of any example herein, particularly example 1, wherein the waste receptacle attachment feature further comprises one or more lateral restraints configured to contain a waste receptacle.

Example 4. The waste receptacle remote transport device of any example herein, particularly example 1, further comprising one or more stabilizing arms, wherein each of the one or more stabilizing arms has one or more stabilizing wheels.

Example 5. The waste receptacle remote transport device of any example herein, particularly example 1, wherein the electronics module further comprises a global positioning satellite device.

Example 6. The waste receptacle remote transport device of any example herein, particularly example 1, wherein the two-way communication device is a Wi-Fi transmitter and receiver or a cellular transmitter and receiver.

Example 7. The waste receptacle remote transport device of any example herein, particularly example 1, wherein the two-way communication device is configured to transmit data to a remote control center, wherein the remote control center simultaneously remotely controls a plurality of waste receptacle remote transport devices.

Example 8. The waste receptacle remote transport device of example herein, particularly example 1, further comprising one or more video cameras, one or more headlights, or any combination thereof.

Example 9. The waste receptacle remote transport device of any example herein, particularly example 1, further comprising one or more ultrasonic proximity sensors.

Example 10. A remotely positionable waste receptacle assembly, comprising a waste receptacle and a waste receptacle remote transport device. The waste receptacle remote transport device further comprises a first axle assembly, a power source, and an electronics module. The first axle assembly is integrally attached to the waste receptacle and has a first axle, one or more wheels configured to move and steer the waste receptacle remote transport device, and one or more motor components configured to rotate the one or more wheels. The power source is configured to supply power to the one or more motor components. The electronics module further comprises one or more microprocessors and a two-way communications device. The one or more microprocessors are configured to control the one or more motor components. The two-way communications device is configured to receive input commands from a human user through a computerized device, to relay the input commands to the one or more microprocessors, to receive data from the microprocessor, and to transmit data from the microprocessor to the human user through the computerized device.

Example 11. The remotely positionable waste receptacle assembly of any of the example herein, particularly example 10, wherein the waste receptacle remote transport device further comprising one or more stabilizing arms, wherein each of the one or more stabilizing arms has one or more stabilizing wheels Example 12. The remotely positionable waste receptacle assembly of any example herein, particularly example 10, wherein the electronics module further comprises a global positioning satellite device.

Example 13. The remotely positionable waste receptacle assembly of any example herein, particularly example 10, wherein the two-way communication device is a Wi-Fi transmitter and receiver or a cellular transmitter and receiver.

Example 14. The remotely positionable waste receptacle assembly of any example herein, particularly example 10, wherein the waste receptacle remote transport device further comprises one or more video cameras, one or more headlights, or any combination thereof.

Example 15. The remotely positionable waste receptacle assembly of any example herein, particularly example 10, wherein the waste receptacle remote transport device further comprises one or more ultrasonic proximity sensors.

Example 16. A method for remote waste disposal, comprising (a) disposing of one or more waste materials in one or more waste receptacle assemblies each having a waste receptacle remote transporter while the one or more waste receptacle assemblies are in a one or more waste disposal locations; (b) transmitting one or more remote positioning commands from a remote human user to one or more waste receptacle remote transporters via one or more computerized devices; (c) transmitting sensor data from the one or more waste receptacle remote transporters to a remote human user via one or more computerized devices; (d) adjusting the one or more remote positioning commands from the remote human user based on the sensor data received from the one or more waste receptacle remote transporters; (e) driving the one or more waste receptacle assemblies from the one or more waste disposal locations to one or more waste collection locations based on the one or more remote positioning commands from the remote human user; (f) collecting the waste materials from the one or more waste receptacle assemblies at the one or more waste collection locations; (g) returning the one or more waste receptacle assemblies having a waste receptacle remote transporter to the one or more waste disposal locations.

Example 17. The method of any example herein, particularly example 16, wherein step (f) further comprises sending a signal to the remote human user to notify the remote human user that the waste materials have been collected and the waste receptacle assembly having a waste receptacle remote transporter may be returned to the waste disposal location.

Example 18. The method of any example herein, particularly example 16, wherein the sensor data is gathered from one or more of a global positioning satellite device, one or more video cameras, one or more ultrasonic sensors, or a compass.

Example 19. The method of any example herein, particularly example 16, wherein remote positioning commands are issued to and sensor data are received from two or more waste receptacles having a waste receptacle remote transporter by a single user.

Example 20. The method of any example herein, particularly example 16, wherein any of steps (b)-(d) are executed multiple times.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A waste receptacle remote transport device, comprising:
   a first axle assembly having a first axle, one or more wheels configured to move and steer the waste receptacle remote transport device, and one or more motor components configured to rotate the one or more wheels;
   a second axle running parallel to and fixedly coupled to the first axle and configured to replace a native axle of a waste receptacle and to attach the waste receptacle remote transport device to a waste receptacle;
   a power source configured to supply power to the one or more motor components; and
   an electronics module further comprising:
      one or more microprocessors configured to control the one or more motor components; and
      a two-way communication device configured to receive input commands from a human user through a computerized device, to relay the input commands to the one or more microprocessors, to receive data from the microprocessor, and to transmit data from the microprocessor to the human user through the computerized device.

2. The waste receptacle remote transport device of claim 1, wherein the waste receptacle attachment feature further comprises one or more lateral restraints configured to contain a waste receptacle.

3. The waste receptacle remote transport device of claim 1, further comprising one or more stabilizing arms, wherein each of the one or more stabilizing arms has one or more stabilizing wheels.

4. The waste receptacle remote transport device of claim 1, wherein the electronics module further comprises a global positioning satellite device.

5. The waste receptacle remote transport device of claim 1, wherein the two-way communication device is a Wi-Fi transmitter and receiver or a cellular transmitter and receiver.

6. The waste receptacle remote transport device of claim 1, wherein the two-way communication device is configured to transmit data to a remote control center, wherein the remote control center simultaneously controls a plurality of waste receptacle remote transport devices.

7. The waste receptacle remote transport device of claim 1, further comprising one or more video cameras, one or more headlights, or any combination thereof.

8. The waste receptacle remote transport device of claim 1, further comprising one or more ultrasonic proximity sensors.

9. A remotely positionable waste receptacle assembly, comprising:
   a waste receptacle; and
   a waste receptacle remote transport device further comprising:
      a first axle assembly integrally attached to the waste receptacle and having a first axle, a second axle running parallel to and fixedly coupled to the first axle and configured to replace a native axle of a waste receptacle, one or more wheels configured to move and steer the waste receptacle remote transport device, and one or more motor components configured to rotate the one or more wheels;
      a power source configured to supply power to the one or more motor components; and
      an electronics module having one or more microprocessors configured to control the one or more motor components and a two-way communication device configured to receive input commands from a human user through a computerized device, to relay the input commands to the one or more microprocessors, to receive data from the microprocessor, and to transmit data from the microprocessor to the human user through the computerized device.

10. The remotely positionable waste receptacle assembly of claim 9, wherein the waste receptacle remote transport device further comprises one or more stabilizing arms, wherein each of the one or more stabilizing arms has one or more stabilizing wheels.

11. The remotely positionable waste receptacle assembly of claim 9, wherein the electronics module further comprises a global positioning satellite device.

12. The remotely positionable waste receptacle assembly of claim 9, wherein the two-way communication device is a Wi-Fi transmitter and receiver or a cellular transmitter and receiver.

13. The remotely positionable waste receptacle assembly of claim 9, wherein the waste receptacle remote transport device further comprises one or more video cameras, one or more headlights, or any combination thereof.

14. The remotely positionable waste receptacle assembly of claim 9, wherein the waste receptacle remote transport device further comprises one or more ultrasonic proximity sensors.

15. A method for remote waste disposal, comprising
   (a) disposing of one or more waste materials in one or more waste receptacle assemblies each having a waste receptacle remote transporter while the one or more waste receptacle assemblies are in a one or more waste disposal locations;
   (b) transmitting a first set of positioning commands from a remote human user to one or more waste receptacle remote transporters via one or more computerized devices;
   (c) transmitting sensor data from the one or more waste receptacle remote transporters to a remote human user via one or more computerized devices;
   (d) adjusting the one or more remote positioning commands from the remote human user based on sensor data received from the one or more waste receptacle remote transporters;
   (e) driving the one or more waste receptacle assemblies from the one or more waste disposal locations to one or more waste collection locations based on the one or more remote positioning commands from the remote human user;
   (f) collecting the waste materials from the one or more waste receptacle assemblies at the one or more waste collection locations;
   (g) transmitting a second set of positioning commands from a remote human user to the one or more waste receptacle remote transporters via the one or more computerized devices after the waste has been collected; and
   (h) returning the one or more waste receptacle assemblies having a waste receptacle remote transporter to the one or more waste disposal locations in response to the second set of positioning commands.

16. The method of claim 15, wherein step (f) further comprises sending a signal to the remote human user to notify the remote human user that the waste materials have been collected and the one or more waste receptacle assemblies having a waste receptacle remote transporter may be returned to the one or more waste disposal locations.

17. The method of claim 15, wherein sensor data are gathered from one or more of a global positioning satellite device, one or more video cameras, one or more ultrasonic sensors, or a compass.

18. The method of claim 15, wherein remote positioning commands are issued to and sensor data are received from two or more waste receptacles having a waste receptacle remote transporter by a single user.

19. The method of claim 15, wherein any of steps (b)-(d) are executed multiple times.

* * * * *